(12) United States Patent
Minato

(10) Patent No.: US 7,791,722 B2
(45) Date of Patent: Sep. 7, 2010

(54) SPECTROPHOTOMETER

(75) Inventor: Hiroyuki Minato, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 178 days.

(21) Appl. No.: 12/212,016

(22) Filed: Sep. 17, 2008

(65) Prior Publication Data
US 2009/0079979 A1 Mar. 26, 2009

(30) Foreign Application Priority Data
Sep. 20, 2007 (JP) ............................. 2007-243175

(51) Int. Cl.
G01J 3/28 (2006.01)
G01J 3/18 (2006.01)
(52) U.S. Cl. ..................... 356/319; 356/318; 356/328
(58) Field of Classification Search ................ 356/319, 356/326, 328
See application file for complete search history.

(56) References Cited
U.S. PATENT DOCUMENTS
4,660,977 A * 4/1987 Wittmer ..................... 356/319

FOREIGN PATENT DOCUMENTS
JP 2001-083093 A 3/2001

* cited by examiner

*Primary Examiner*—F. L Evans
(74) *Attorney, Agent, or Firm*—Sughrue Mion, PLLC

(57) ABSTRACT

A spectrophotometer is provided capable of reducing the influence of the vibration as much as possible when a wavelength dispersion element is rotationally driven and capable of increasing the analysis accuracy. When a fluorescence signal is obtained from the fluorescence detector, the central control unit A/D converts the fluorescence signal at sampling intervals of T1 for vibration convergence determination, and provides the result data to the data processor (S1). At the timing of performing the vibration convergence determination (S2), the data processor performs a predetermined signal processing to the digital signals obtained (S3), and determines whether all the data that have been obtained within a given period of time from the latest data are equal to or smaller than a specified value (S4). If all the data are equal to or smaller than the specified value, it is determined that the diffraction grating's vibration is converged, and the vibration convergence determination operation is terminated. After that, the central control unit changes the A/D conversion sampling interval to the interval T2 for obtaining the analysis data, and performs a spectrofluorometric measurement.

5 Claims, 3 Drawing Sheets

SPECTROPHOTOMETER

BACKGROUND OF THE INVENTION

The present invention relates to a spectrophotometer, such as an ultraviolet visible spectrophotometer, infrared spectrophotometer, and fluorescence spectrophotometer, for analyzing light from a sample onto or into which a beam of light is delivered. More precisely, it relates to a spectrophotometer capable of setting at will the wavelength of light to be delivered onto a sample or the wavelength of light from the sample by driving a wavelength dispersion element.

Generally, a fluorescence spectrophotometer includes: an excitation spectroscopy system for separating light of a predetermined wavelength from the light emitted from a light source and for delivering the light as an excitation light to a sample; a fluorescence spectroscopy system for separating light of a predetermined wavelength from the fluorescence emitted from the sample in response to the excitation light; and a fluorescence detector for detecting the light separated by the fluorescence spectroscopy system and for providing a signal (which will be called "a fluorescence signal" hereinafter) corresponding to the amount of the light detected. The fluorescence signal provided from the fluorescence detector is converted from analog to digital form (i.e. A/D converted), and after that it is computed in a data processor to perform a qualitative/quantitative analysis of the sample.

The excitation spectroscopy system and fluorescence spectroscopy system each include a wavelength dispersion element such as a diffraction grating or prism, and a driving unit for rotationally driving the wavelength dispersion element. The direction of the wavelength dispersion element with respect to the incident light can be appropriately changed by the driving unit so that the wavelength of the excitation light and that of the light detected by the fluorescence detector will be set at will (for example, see Patent Document 1).

In such a fluorescence spectrophotometer, immediately after the wavelength dispersion element is rotated by the driving unit and stopped at a predetermined position, the fluorescence signal is not stabilized since the wavelength dispersion element vibrates. If a qualitative/quantitative analysis on a sample is performed with an unstable fluorescence signal, a correct analysis result cannot be obtained. Given this factor, in a conventional fluorescence spectrophotometer, a period of time in which the diffraction grating's vibration will most likely converge is previously set, and the fluorescence signal after the period of time has elapsed is used for the analysis. However, given the variation between apparatuses, the period of time for the vibration to converge has to be set rather long, which prolongs the waiting time from the initiation of the diffraction grating's driving to the initiation of the measurement.

Generally, fluorescence signals from a fluorescence detector are A/D converted at predetermined sampling intervals and then are sent to a signal processor. In the signal processor, a predetermined computational processing and electrical noise removal processing using a plurality of digital signals are performed, and the result is provided to an output unit such as a display and printer. Hence, the larger the number of signals sent to the signal processor is, the more the analysis accuracy improves. However, in the method in which a measurement is initiated after waiting for the convergence of the diffraction grating's vibration, the number of obtainable pieces of data is small.

One method for avoiding this problem is to initiate a measurement before the vibration of the diffraction grating converges and perform computations or other processes to reduce the influence of the vibration generated in the diffraction grating. With this method, however, it is difficult to completely eliminate the influence of the vibration although the number of obtainable pieces of data can be increased.

Alternatively, a sensor for detecting the vibration of a diffraction grating may be provided and the data-collecting operation may be started as soon as the convergence of the diffraction grating's vibration is detected. With this method, the waiting time for the initiation of measurement can be shortened as much as possible and the number of pieces of sampling data can be increased. However, the product cost increases for providing the vibration detection sensor.

Patent Document 1: Japanese Unexamined Patent Application Publication No. 2001-83093 ([0010], FIG. 1)

SUMMARY OF THE INVENTION

The main objective of the present invention is to provide a spectrophotometer capable of reducing the vibration's influence as much as possible when a wavelength dispersion element is rotationally driven, and capable of increasing the analysis accuracy.

The present invention to achieve the objective provides a spectrophotometer including:

a) a first optical system for delivering light from a light source to a sample;

b) a light detector for detecting light from the sample;

c) a second optical system for introducing the light from the sample to the light detector;

d) a wavelength dispersion element provided in at least one of the first optical system and the second optical system;

e) a driving unit for driving the wavelength dispersion element;

f) a computational processor for sampling, at predetermined sampling intervals, a light detection signal from the light detector after a driving operation of the wavelength dispersion element by the driving unit is halted, for analog/digital (A/D) converting the sampled signal, and for performing a computational processing of the A/D converted signal; and g) a vibration convergence determiner for determining, based on a light detection signal processed by the computational processor, that a vibration generated in the wavelength dispersion element due to the driving operation is converged.

While the wavelength dispersion element vibrates immediately after the driving is halted, the light detection signal from the light detector is not stable and significantly fluctuates compared to that after the vibration of the wavelength dispersion element converges. Hence, the vibration state of the wavelength dispersion element can be determined based on the fluctuation range of the light detection signal. In this case, however, if the same sampling interval of the light detection signal, which is analogue signal, is set both for the period in which the light detection signal significantly fluctuates under the influence of the wavelength dispersion element's vibration and for the period in which the light detection signal is stable after the wavelength dispersion element converges, the vibration state of the wavelength dispersion element might not be grasped from signals after the A/D conversion and the signal processing speed after the A/D conversion might become slow.

Given this factor, the spectrophotometer according to the present invention may preferably further include an interval setting section for setting, as an interval T1 suitable for obtaining data for the vibration convergence determination, a sampling interval of the computational processor until a vibration convergence in the wavelength dispersion element is determined by the vibration convergence determiner, and for setting, as an interval T2 suitable for obtaining data for the sample analysis, a sampling interval of the computational processor after the vibration convergence is determined.

In order to digitally sample an analog signal and reproduce it, it is known that the frequency twice as high as that of the analog signal is required (i.e. sampling theory). Hence, it is preferable that the vibration convergence determination interval T1 may be set to be not more than one half of the sample analysis interval T2.

The spectrophotometer according to the present invention A/D converts and computationally processes the light detection signal from the light detector, such as a photoelectron multiplier and photodiode, for detecting the light from the sample, and determines the vibration convergence of the wavelength dispersion element based on the digital signal. Therefore, the spectrophotometer does not need to unnecessarily include a vibration detection sensor. This leads to a low-cost and downsized apparatus.

Since the spectrophotometer according to the present invention starts a measurement before the wavelength dispersion element's vibration converges, it is possible to eliminate the waiting time after the driving of the wavelength dispersion element is halted and before the measurement is started. What is more, with the vibration convergence determiner, it is possible to eliminate the influence of the vibration of the wavelength dispersion element on the light detection signals.

EXPLANATION OF THE NUMERALS

1 . . . Fluorescence Spectrophotometer
10 . . . Light Source Unit
11 . . . Light Source
20 . . . Excitation Spectroscopic Unit (First Optical System)
22 . . . Diffraction Grating (Wavelength Dispersion Element)
24 . . . Grating Drive Unit
50 . . . Fluorescence Spectroscopic Unit (Second Optical System)
52 . . . Diffraction Grating (Wavelength Dispersion Element)
54 . . . Fluorescence Detector
55 . . . Grating Drive Unit
60 . . . Control System
61 . . . Central Control Unit (Vibration Convergence Determiner, Interval Setting Section)
63 . . . Data Processor

DETAILED DESCRIPTION OF A PREFERRED EMBODIMENT

Hereinafter, an embodiment in which the present invention is applied for a fluorescence spectrophotometer will be described with reference to FIGS. 1 through 5.

Figure 1:
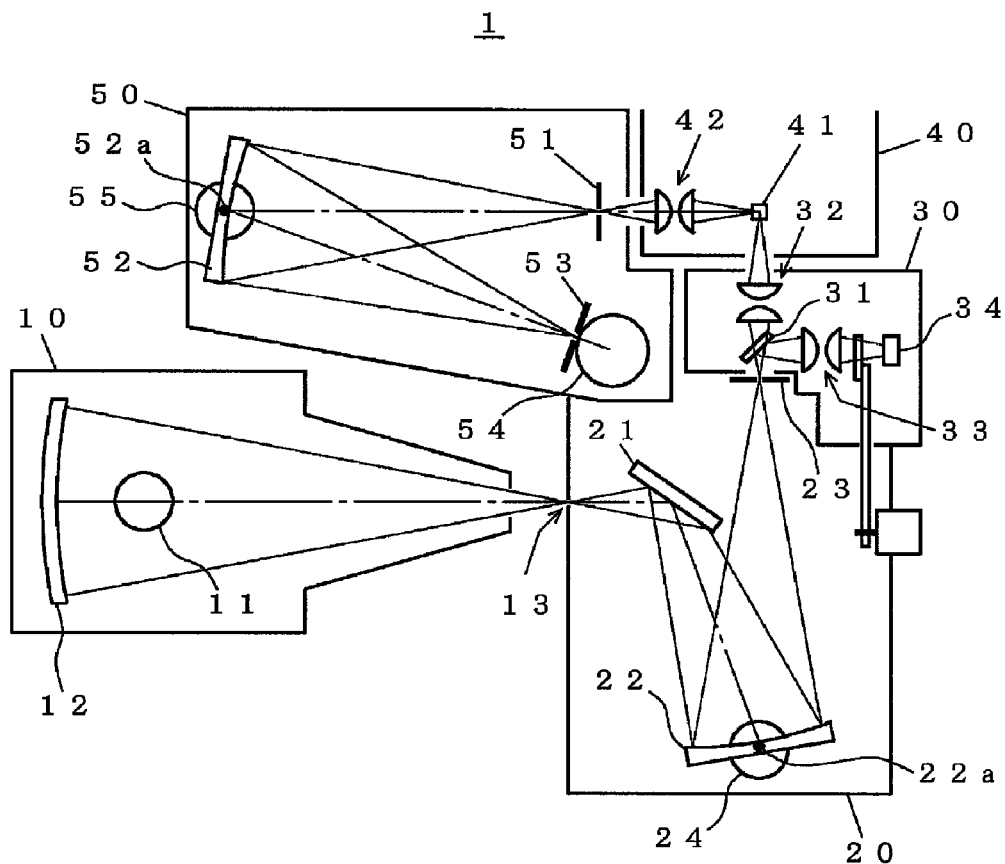
FIG. 1 illustrates a schematic configuration of the fluorescence spectrophotometer according to an embodiment of the present invention.

FIG. 1 is a diagram illustrating the schematic configuration of the fluorescence spectrophotometer which is a first embodiment of the present invention. The fluorescence spectrophotometer 1 is composed of a light source unit 10, an excitation spectroscopic unit 20, a monitor unit 30, a sample chamber 40, and a fluorescence spectroscopic unit 50. The light source unit 10 includes a converging mirror 12 for collecting the light emitted from the light source 11, such as a xenon lamp. The light collected by the converging mirror 12 travels into an excitation spectroscopic unit 20 through the first slit 13. The light which has entered the excitation spectroscopic unit 20 is reflected toward the first diffraction grating 22, which is a wavelength dispersion element, by the mirror 21, and will be dispersed in the wavelength direction by the diffraction grating 22. A portion of the light dispersed by the diffraction grating 22 enters, as an excitation light, the monitor unit 30 through the second slit 23. The excitation spectroscopic unit 20 includes a grating drive unit 24 for rotationally driving the diffraction grating 22 centering on a rotational axis 22a. The wavelength of the excitation light can be set at will within a predetermined wavelength range by appropriately changing the direction of the diffraction grating 22 by the grating drive unit 24.

On the light path of the excitation light in the monitor unit 30, a beam splitter 31 is placed, which separates the excitation light into two directions. That is, a portion of the excitation light passes through the beam splitter 31, then is collected by the first lens 32, and after that reaches a sample cell 41 placed in the sample chamber 40. On the other hand, another portion of the excitation light is reflected by the beam splitter 31, then collected by the second lens 33, and after that, detected by a contrast light detector 34 (e.g. a photodiode).

When the excitation light reaches the sample cell 41, the sample in the cell produces fluorescence. A portion of this fluorescence is collected by the third lens 42 and enters a fluorescence spectroscopic unit 50. A portion of the fluorescence which has entered the fluorescence spectroscopic unit 50 reaches the second diffraction grating 52 through the third slit 51, and is dispersed in the wavelength direction by the diffraction grating 52. Among the lights dispersed in this manner, the portion of the light having a certain wavelength is detected by a fluorescence detector 54 (e.g. a photoelectron multiplier) through the fourth slit 53. In the fluorescence spectroscopic unit 50, a grating drive unit 55 for rotationally driving the diffraction grating 52 centering on a rotational axis 52a is provided. The wavelength of the excitation light detected by the fluorescence detector 54 can be set at will within a predetermined wavelength range by appropriately changing the direction of the diffraction grating 52 by the grating drive unit 55.

Figure 2:
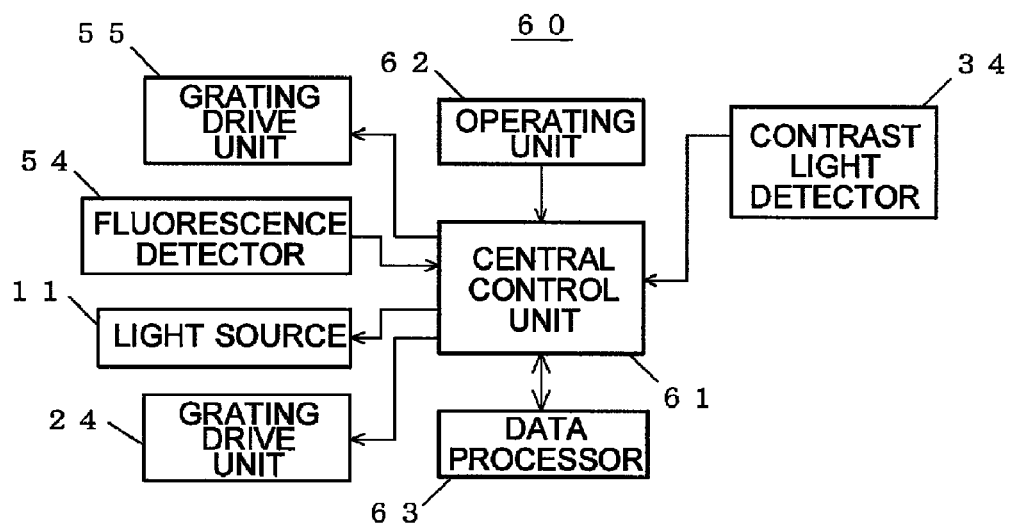
FIG. 2 is a block diagram illustrating a schematic configuration of the control system.

FIG. 2 is a block diagram illustrating the schematic configuration of the control system 60 of the fluorescence spectrophotometer 1. The control system 60 is configured centering on a central control unit 61. To the central control unit 61, grating drive units 24 and 55, a fluorescence detector 54, a light source 11, a contrast light detector 34, an operating unit 62, a data processor 63, and other units are connected.

The user can enter a variety of commands and setting data into the central control unit 61 through the operating unit 62. When the user sets the wavelength for generating the excitation light (i.e. excitation wavelength) and the wavelength for detecting the fluorescence (i.e. fluorescence wavelength), and then enters a measurement start command into the central control unit 61, the central control unit 61 controls the two grating drive units 24 and 55 to make each of the two diffraction gratings 22 and 52 point the direction corresponding to each wavelength set, and turns on the light source 11. Each of the grating drive units 24 and 55 includes a stepping motor and a reduction gear unit for example. In the central control unit 61, a conversion table indicating the correspondence relationship between the pulse number given to each motor and the wavelength is stored in advance.

When the light is detected, with the lighting of the light source 11, by the fluorescence detector 54 and the contrast light detector 34, electric signals in accordance with the light intensity are provided. The electric signals from the fluorescence detector 54 and the contrast light detector 34 are provided to the central control unit 61 as a fluorescence signal and contrast light signal, respectively. When the driving of the diffraction gratings 22 and 52 by the grating drive units 24 and 55 is finished, the central control unit 61 A/D converts the fluorescence signals and contrast light signals obtained at predetermined sampling intervals, and provides the converted signals to the data processor 63.

Figure 3:
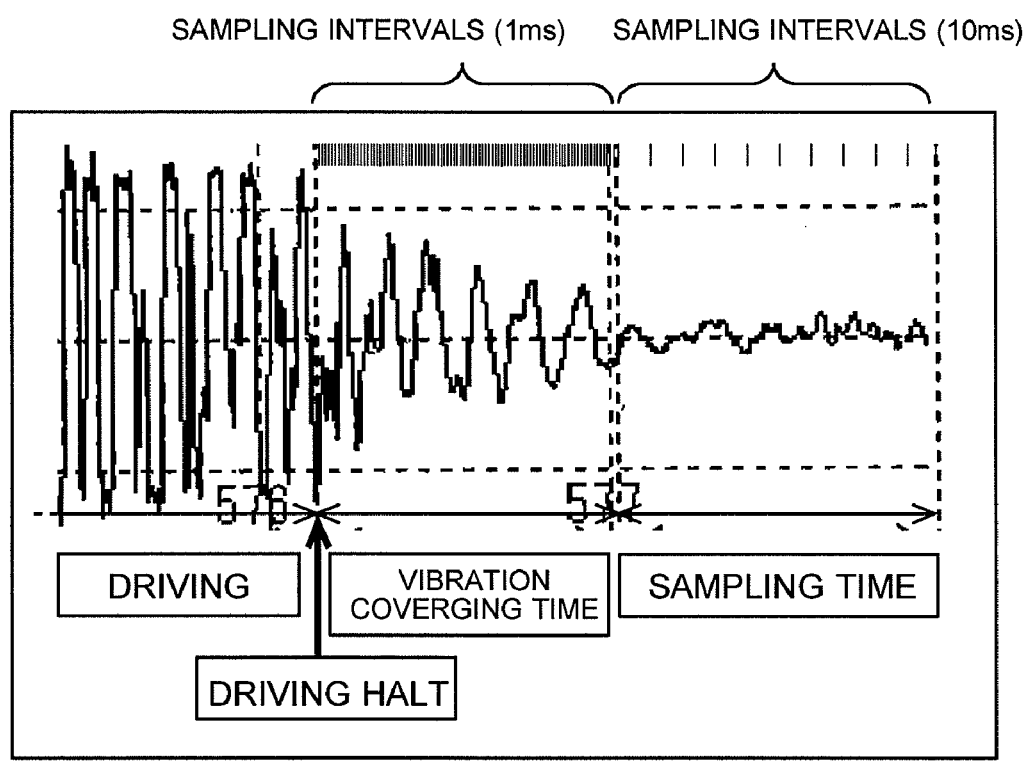
FIG. 3 is a diagram for explaining the fluctuations of the fluorescent signal and contrast light signal caused by the vibration of the diffraction grating.

FIG. 3 is a diagram for explaining the difference of the fluorescent signal (contrast light signal) among the three periods of time: the period of time while the diffraction grating 22 (diffraction grating 52) is driven, the period of time after the diffraction grating 22 is stopped and before the vibration is converged, and the period of time after the vibration of the diffraction grating 22 is converged. As illustrated in FIG. 3, the diffraction grating 22 vibrates while it is being driven, which significantly fluctuates the fluorescence signal. After the driving of the diffraction grating 22 is halted, it vibrates for a while, although the vibration fades away. At the same time, the fluorescence signal's fluctuation also fades away. After the vibration of the diffraction grating 22 is converged, the fluorescence signal's fluctuation becomes very small.

As just described, the data's fluctuation range differs depending on the period of time when the data is obtained. Based on this, the central control unit 61 A/D converts the fluorescence signal and contrast light signal at the sampling intervals of T1 after the measurement is started and before the vibration convergences of the diffraction gratings 22 and 52 are determined, and A/D converts the fluorescence signal and contrast light signal at the sampling intervals of T2 after the vibration convergences of the diffraction gratings 22 and 52 are determined. Hence, in the present embodiment, the central control unit 61 functions as the interval setting section. Although in the present embodiment, the interval T1 is set to be 1 (ms) and the interval T2 is set to be 10 (ms) in consideration of the fluctuation range of the fluorescence signal and contrast light signal due to the vibrations of the diffraction gratings 22 and 52, the interval T1 can be any period as long as it is not more than one half of the interval T2.

After the fluorescence signal and contrast light signal which have been A/D converted by the central control unit 61 are entered into the data processor 63, a predetermined computation process is performed to each signal. The central control unit 61 controls the operations of the data processor 63, the grating drive units 24 and 55, and other units, in order to perform the vibration convergence determinations for the diffraction gratings 22 and 52, and, then performs the spectrofluorometric measurement for the sample based on the determination result.

At this point, the vibration convergence determination operations for the diffraction gratings 22 and 52 performed under the control of the central control unit 61 will be described with reference to FIGS. 4 and 5. Although the following explanation centers on the vibration convergence determination operation for the diffraction grating 22 in the excitation spectroscopic unit 20, the similar vibration convergence determination operation is also performed for the diffraction grating 52 in the fluorescence spectroscopic unit 50.

Figure 4:
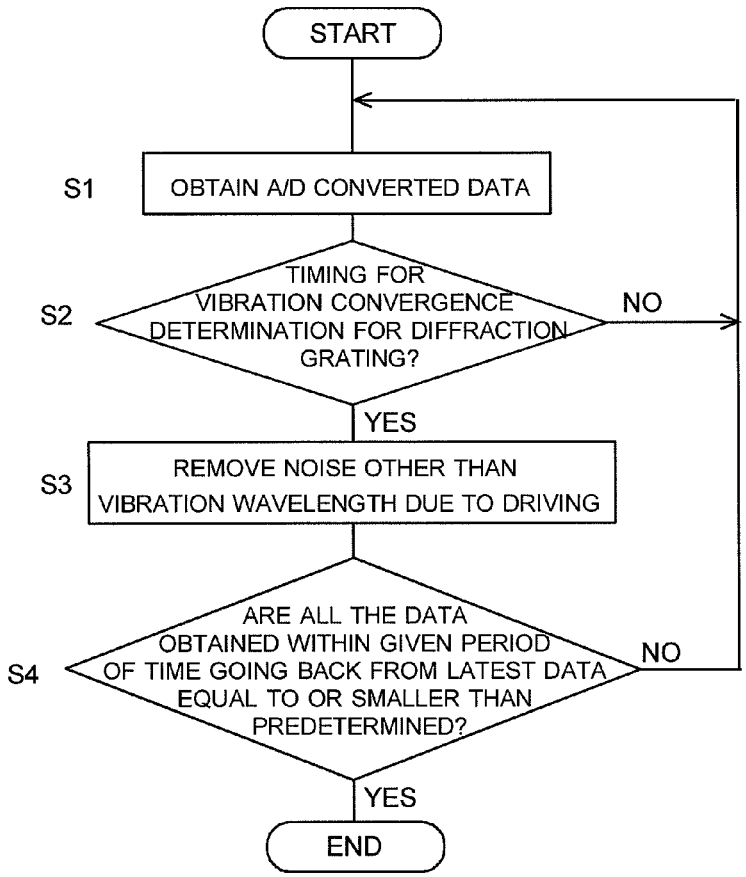
FIG. 4 is a flowchart illustrating the vibration convergence determination operation for the diffraction grating.
Figure 5:
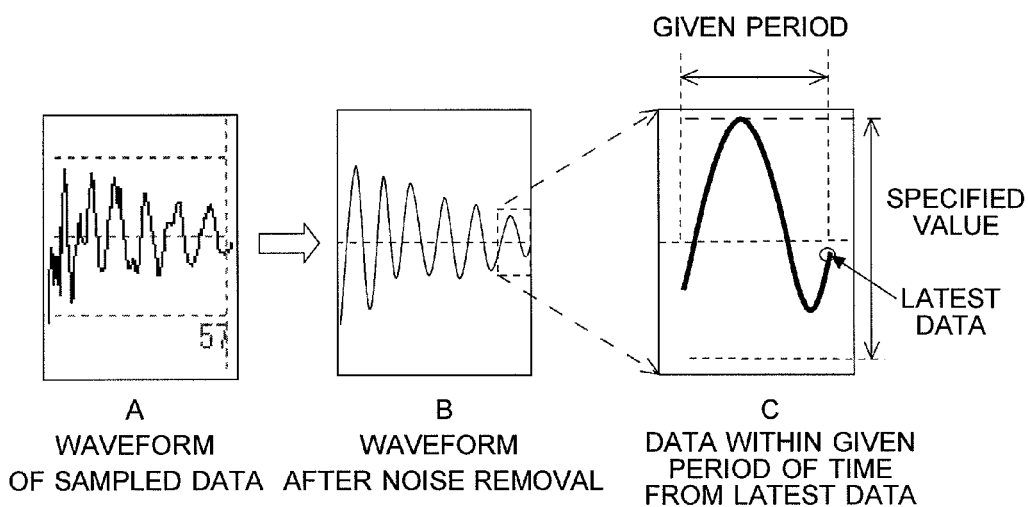
FIG. 5 is a diagram for explaining a signal processing in the vibration convergence determination operation.

The flowchart of FIG. 4 starts with the initiation of the measurement. First, the data processor 63 obtains the digital data of the fluorescence signal, as illustrated in diagram A in FIG. 5, from the central control unit 61 (Step S1). In Step S2, it is determined whether or not it is the timing for the vibration convergence determination for the diffraction grating 22; in the case where it is not the vibration convergence determination timing (NO), the process returns to Step S1, and in the case where it is the vibration convergence determination timing (YES), a signal processing for reducing noise other than those of driving frequency by, for example, the moving average method or other processing is performed (Step S3). The vibration convergence determination operation for the diffraction grating 22 is started at the point in time when a predetermined period of time has elapsed after the driving of the diffraction grating 22 is halted. Diagram B in FIG. 5 illustrates the data after the noise removal.

In Step S4, it is determined whether or not all the data obtained within a given period of time going back from the latest data are equal to or smaller than a specified value. If any data is larger than the specified value (NO), it is determined that the vibration of the diffraction grating 22 has not converged and the process returns to Step S1. If all the data are equal to or smaller than the specified value (YES), it is determined that the vibration of the diffraction grating 22 has converged, and the vibration convergence determination operation is terminated. Diagram C in FIG. 5 illustrates the relationship between the data within the range from the latest data to the data in a given length toward the past and the specified value. After that, the central control unit 61 changes the sampling interval for the A/D conversion to the interval T2 for obtaining the analysis data and performs a spectrofluorometric measurement.

The present invention is not limited to the previously described embodiment. For example, the following modifications can be made.

After the diffraction grating's vibration convergence is determined, in place of changing the sampling interval for the A/D conversion from T1 to T2, the sampling interval may remain unchanged and the data may be thinned when a predetermined signal processing is performed.

The present invention can also be applied to a spectrophotometer having one wavelength dispersion element and a driving unit for driving this wavelength dispersion element. In addition, other than a fluorescence spectrophotometer, it can also be applied to various types of spectrophotometers such as ultraviolet, visible, near-infrared, and infrared ones.

It should be noted that the embodiment described thus far is merely an example, and it is evident that any modification, adjustment or addition properly made within the spirit of the preset invention is also covered within the scope of the present invention.

What is claimed is:

1. A spectrophotometer comprising:
a) a first optical system for delivering light from a light source to a sample;
b) a light detector for detecting light from the sample;
c) a second optical system for introducing the light from the sample to the light detector;
d) a wavelength dispersion element provided in at least one of the first optical system and the second optical system;
e) a driving unit for driving the wavelength dispersion element;
f) a computational processor for sampling, at predetermined sampling intervals, a light detection signal from the light detector after a driving operation of the wavelength dispersion element by the driving unit is halted, for analog/digital (A/D) converting the sampled signal, and for performing a computational processing of the A/D converted signal; and
g) a vibration convergence determiner for determining, based on a light detection signal processed by the computational processor, that a vibration generated in the wavelength dispersion element due to the driving operation is converged.

2. The spectrophotometer according to claim 1, further comprising an interval setting section for setting, as a vibration convergence determination interval T1, a sampling interval of the computational processor before a vibration convergence in the wavelength dispersion element is determined by the vibration convergence determiner, and for setting, as a sample analysis interval T2, a sampling interval of the computational processor after the vibration convergence is determined.

3. The spectrophotometer according to claim 2, wherein the vibration convergence determination interval T1 is not more than one half of the sample analysis interval T2.

4. The spectrophotometer according to claim 1, wherein the vibration convergence determiner determines a vibration state of the wavelength dispersion element based on a fluctuation range of the light detection signal.

5. The spectrophotometer according to claim 4, wherein the vibration convergence determiner determines that the vibration of the diffraction grating has converged if all the light detection signals obtained within a given period of time going back from the latest signal have values equal to or smaller than a specified value.

* * * * *